(12) United States Patent
Han et al.

(10) Patent No.: US 11,189,889 B2
(45) Date of Patent: Nov. 30, 2021

(54) RECHARGEABLE BATTERY

(71) Applicants: SAMSUNG SDI CO., LTD., Yongin-si (KR); UNIST(ULSAN NATIONAL INSTITUTE OF SCIENCE AND TECHNOLOGY), Ulsan (KR)

(72) Inventors: Da-Un Han, Yongin-si (KR); Minjoon Park, Ulsan (KR); Jaephil Cho, Ulsan (KR); Hyungyeon Cha, Ulsan (KR)

(73) Assignees: Samsung SDI Co., Ltd., Yongin-si (KR); UNIST (Ulsan National Institute of Science and Technology), Ulsan (KR)

( * ) Notice: Subject to any disclaimer, the term of this patent is extended or adjusted under 35 U.S.C. 154(b) by 96 days.

(21) Appl. No.: 16/319,206

(22) PCT Filed: Aug. 11, 2017

(86) PCT No.: PCT/KR2017/008735
§ 371 (c)(1),
(2) Date: Jan. 18, 2019

(87) PCT Pub. No.: WO2018/030835
PCT Pub. Date: Feb. 15, 2018

(65) Prior Publication Data
US 2019/0280282 A1 Sep. 12, 2019

(30) Foreign Application Priority Data
Aug. 11, 2016 (KR) .................. 10-2016-0102530

(51) Int. Cl.
| H01M 50/538 | (2021.01) |
| H01M 10/0587 | (2010.01) |
| H01M 50/50 | (2021.01) |
| H01M 50/531 | (2021.01) |

(52) U.S. Cl.
CPC ..... *H01M 50/538* (2021.01); *H01M 10/0587* (2013.01); *H01M 50/50* (2021.01); *H01M 50/531* (2021.01); *Y02P 70/50* (2015.11)

(58) Field of Classification Search
CPC ...... H01M 2/263; H01M 2/26; H01M 50/538; H01M 50/50; H01M 50/531; H01M 10/0587; Y02P 70/50
See application file for complete search history.

(56) References Cited

U.S. PATENT DOCUMENTS

| 8,927,068 | B2 | 1/2015 | Brown et al. | |
| 2010/0279161 | A1* | 11/2010 | Kang | H01M 10/0436 |
| | | | | 429/94 |
| 2011/0171516 | A1* | 7/2011 | Byun | H01M 2/263 |
| | | | | 429/161 |
| 2012/0058387 | A1 | 3/2012 | Ahn | |
| 2014/0011065 | A1 | 1/2014 | Kwon et al. | |
| 2014/0087224 | A1 | 3/2014 | Kim et al. | |
| 2014/0363702 | A1 | 12/2014 | Kim | |
| 2014/0370345 | A1 | 12/2014 | Maleki et al. | |
| 2015/0086820 | A1 | 3/2015 | Lee et al. | |
| 2016/0099454 | A1 | 4/2016 | Kwon et al. | |

FOREIGN PATENT DOCUMENTS

| CN | 103797636 A | 5/2014 |
| CN | 105098249 A | 11/2015 |
| CN | 105576280 A | 5/2016 |
| JP | 2001-52762 A | 2/2001 |
| KR | 20-0437635 Y1 | 12/2007 |
| KR | 10-1199125 B1 | 11/2012 |
| KR | 10-2013-0045219 A | 5/2013 |
| KR | 10-2013-0135017 A | 12/2013 |
| KR | 10-2014-0099709 A | 8/2014 |
| KR | 10-2014-0108944 A | 9/2014 |
| KR | 10-2014-0142978 A | 12/2014 |
| KR | 10-2015-0131545 A | 11/2015 |
| KR | 10-2016-0040047 A | 4/2016 |
| KR | 10-2016-0055778 A | 5/2016 |
| KR | 10-2016-0089968 A | 7/2016 |

OTHER PUBLICATIONS

Korean Office Action dated Nov. 4, 2020, issued in corresponding Korean Patent Application No. 10-2016-0102530 (7 pages).
China Office Action and Search Report from corresponding China Patent Application No. 201780048298.5, with English Translation, China Office Action dated May 8, 2021 and accompanying Search Report dated Apr. 27, 2021 (16 pages).

* cited by examiner

*Primary Examiner* — Ladan Mohaddes
(74) *Attorney, Agent, or Firm* — Lewis Roca Rothgerber Christie LLP (57) ABSTRACT

The present disclosure relates to a rechargeable battery including a cell assembly including a plurality of unit cells disposed to be separated by a predetermined interval, a casing member receiving the cell assembly, a first connection part connecting the plurality of unit cells, and a second connection part disposed parallel to the first connection part and connecting the plurality of unit cells, wherein each of the plurality of unit cells includes a first electrode, a second electrode, and a separator interposed between the first electrode and the second electrode.

15 Claims, 7 Drawing Sheets

RECHARGEABLE BATTERY

CROSS-REFERENCE TO RELATED APPLICATION(S)

This application is a National Phase Patent Application of International Patent Application Number PCT/KR2017/008735, filed on Aug. 11, 2017, which claims priority of Korean Patent Application No. 10-2016-0102530, filed Aug. 11, 2016. The entire contents of both of which are incorporated herein by reference.

TECHNICAL FIELD

The present disclosure relates to a rechargeable battery.

BACKGROUND ART

Unlike a primary battery that cannot be recharged, a rechargeable battery can be repeatedly charged and discharged. A low capacity rechargeable battery is used for small electronic devices such as mobile phones, notebook computers, camcorders, and the like, and a large-capacity rechargeable battery is commonly used as a power source for driving a motor of a hybrid electric vehicle and the like.

Recently, a high output rechargeable battery using a non-aqueous electrolyte with high energy density has been developed, and it is formed as a large-capacity rechargeable battery configured by connecting a plurality of rechargeable batteries in series so as to be used for driving a motor of a device, i.e., an electric vehicle and the like, that requires much power.

In general, the rechargeable battery includes an electrode assembly including a positive electrode, a negative electrode, and a separator interposed between the positive electrode and the negative electrode. The electrode assembly is inserted into the case to perform charging and discharging, and the case is provided with a terminal to receive or supply current.

Recently, attention has been focused on development and commercial availability of flexible electronic devices such as flexible displays, wearable mobile phones, and watches. Therefore, there is a growing demand for a flexible characteristic for a rechargeable battery, which is a power supply for such a flexible electronic device.

DISCLOSURE

Technical Problem

Exemplary embodiments provide a rechargeable battery realizing a flexible characteristic while having excellent capacity.

Technical Solution

The present disclosure provides a rechargeable battery including a cell assembly including a plurality of unit cells disposed to be separated by a predetermined interval, a casing member receiving the cell assembly, a first connection part connecting the plurality of unit cells, and a second connection part disposed parallel to the first connection part and connecting the plurality of unit cells, wherein each of the plurality of unit cells includes a first electrode, a second electrode, and a separator interposed between the first electrode and the second electrode.

Advantageous Effects

According to an exemplary embodiment, the rechargeable battery of the present disclosure may provide a rechargeable battery with remarkably improved flexibility while having excellent battery capacity.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present invention is not limited thereto.

In addition, unless explicitly described to the contrary, the word "comprise" and variations such as "comprises" or "comprising" will be understood to imply the inclusion of stated elements but not the exclusion of any other elements.

Figure 1:
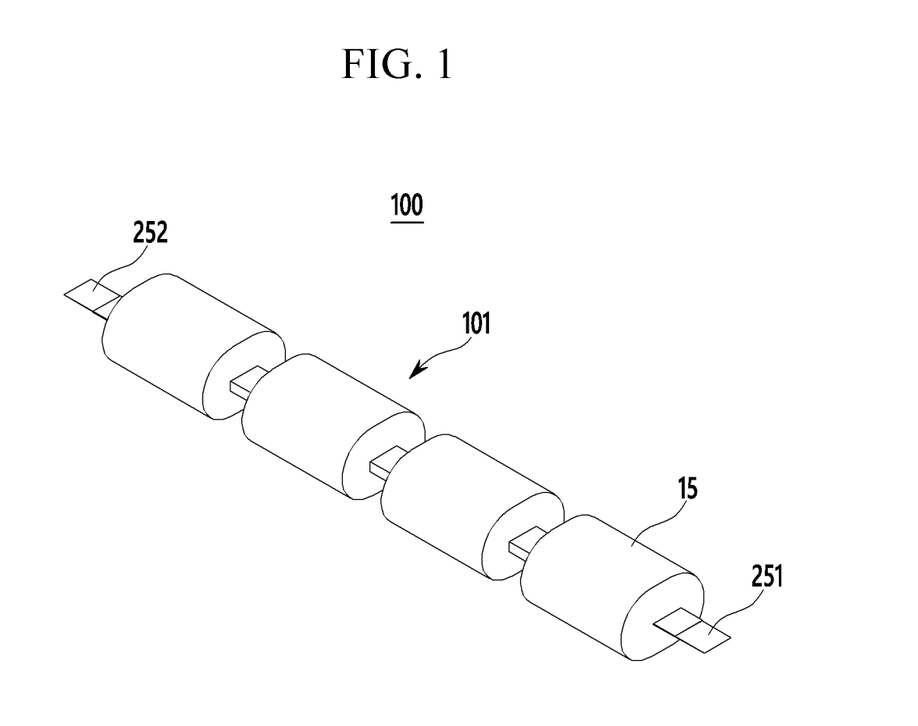
FIG. 1 is a perspective view of a rechargeable battery according to an exemplary embodiment according to the present disclosure.
Figure 2:
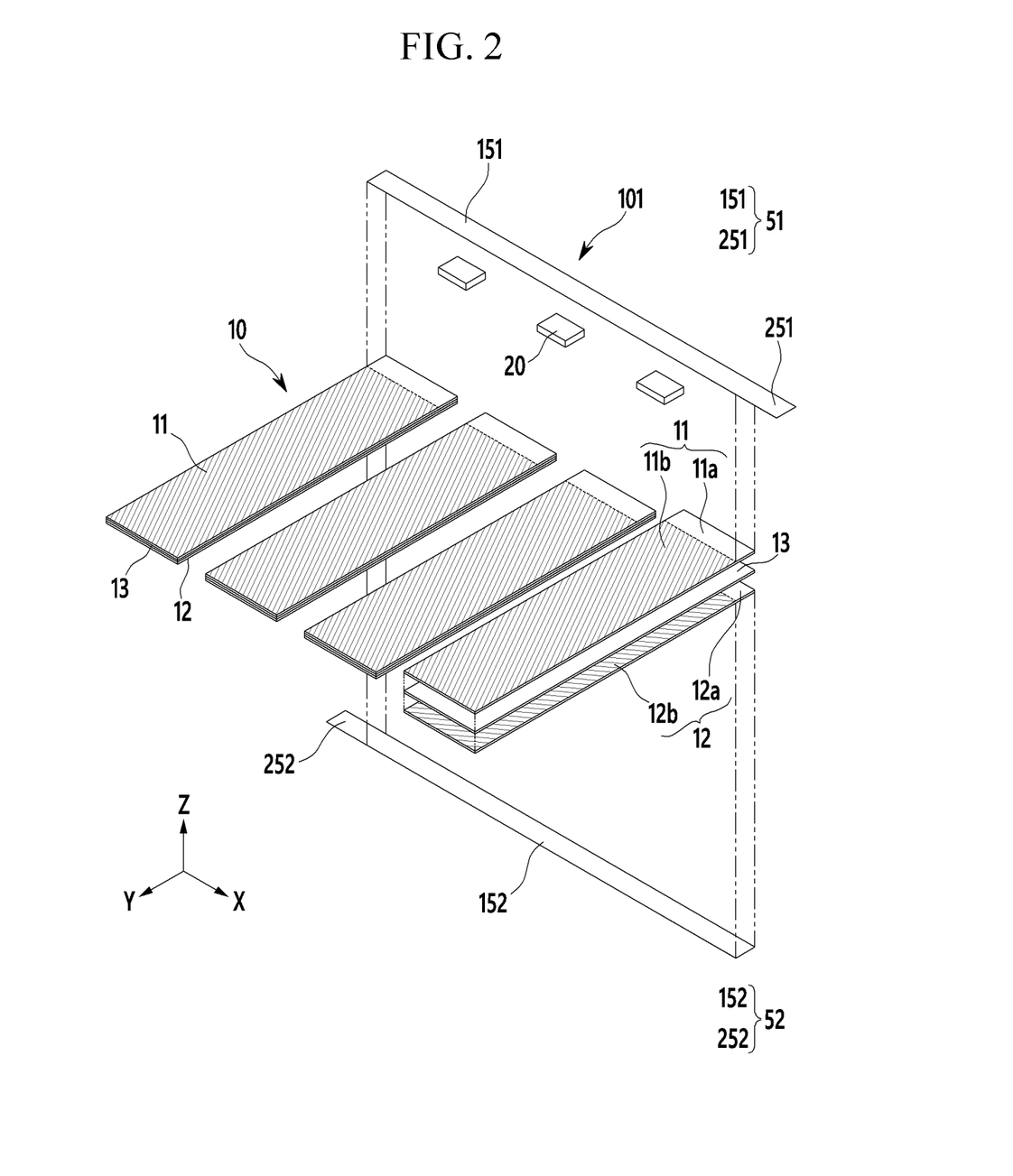
FIG. 2 is an exploded perspective view of the rechargeable battery according to FIG. 1 for spiral-winding.

FIG. 1 is a perspective view of a rechargeable battery according to an exemplary embodiment according to the present disclosure, and FIG. 2 is an exploded perspective view of the rechargeable battery according to FIG. 1 for spiral-winding.

Referring to FIG. 1 and FIG. 2, the rechargeable battery 100 according to an exemplary embodiment of the present disclosure includes a cell assembly 101 and a casing member 15 receiving the cell assembly 101.

The cell assembly 101 includes a plurality of unit cells 10 disposed to be separated by a predetermined interval.

Each of the plurality of unit cells 10 includes a first electrode 11, a second electrode 12, and a separator 13 interposed between the first electrode 11 and the second electrode 12.

As shown in FIG. 2, the unit cell 10 may be formed in a structure in which the first electrode 11 and the second electrode 12 that are formed as rectangular sheets with a pair of long sides and a pair of short sides that are alternately stacked with a separator 13 disposed therebetween. FIG. 2 shows only one first electrode 11 and one second electrode 12 for convenience, however each unit cell 10 may have a structure in which a plurality of first electrodes and a plurality of second electrodes are stacked via a separator interposed therebetween.

In the present disclosure, polarities of the first electrode 11 and the second electrode 12 are not particularly limited. That is, the first electrode 11 may be a positive electrode and the second electrode 12 may be a negative electrode, or the first electrode 11 may be a negative electrode and the second electrode 12 may be a positive electrode. Hereinafter, an example in which the first electrode 11 is the positive electrode and the second electrode 12 is the negative electrode is described for convenience.

The first electrode 11 may include a first uncoated region 11a and a first coated region 11b. The first uncoated region 11a and the first coated region 11b may be disposed at one surface or both surfaces of a first current collector (not shown).

The first current collector can be made of a thin metal plate with electrical conductivity, and includes the first coated region 11b coated with the active material and the first uncoated region 11a not coated with the active material. Thus, the first uncoated region 11a is the region where the first current collector is exposed.

The first current collector may be, for example, in the form of a mesh, or may be in the form of a metal foil. Also, the first current collector may be made of aluminum or an aluminum alloy, for example.

The first coated region 11b may be formed using a material containing a compound (a lithiated intercalation compound) capable of reversible intercalation and deintercalation of lithium, but is not limited thereto.

The second electrode 12 may include a second uncoated region 12a and a second coated region 12b. The second uncoated region 12a and the second coated region 12b may be disposed on one or both sides of the second current collector (not shown).

The second current collector may be made of a thin metal plate with electrical conductivity, and includes the second coated region 12b coated with the active material and the second uncoated region 12a not coated with the active material. Thus, the second uncoated region 12a is the region where the second current collector is exposed.

The second current collector may be, for example, in the form of the mesh, or in the form of the metal foil. The second current collector may also be made of, for example, copper or a copper alloy.

The first coated region 11b may be formed using a material including at least one of a carbon material such as a crystalline carbon, an amorphous carbon, a carbon composite material, and a carbon fiber, a lithium metal, a metal oxide, and a lithium alloy, but is not limited.

The separator 13 separates the first electrode 11 and the second electrode 12 and provides a passage for lithium ions, and any separator may be used as long as it is commonly used in rechargeable batteries. In other words, any separator 13 with excellent electrolyte solution wettability while having low resistance against ion movement of the electrolyte may be used.

For example, the separator 13 may be any one selected from a glass fiber, Teflon, polyethylene, polypropylene, polytetrafluoroethylene (PTFE), and combinations thereof, and may also be a non-woven or woven fabric type. Further, a separator coated with a ceramic component or a polymer material in order to secure mechanical strength or heat resistance may be optionally used in a single layer or multilayer structure In the present exemplary embodiment, the first electrode 11, the second electrode 12, and the separator 13 are included as separate members in each unit cell 10. For example, the first electrode 11, the second electrode 12, and the separator 13 that are separated for each unit cell 10 may be respectively included.

The cell assembly 101 includes a plurality of unit cells 10 described above.

At this time, the unit cells 10 may be respectively connected through a first connection part 51 and a second connection part 52 which are arranged in parallel.

In the present exemplary embodiment, the first connection part 51 and the second connection part 52 may be disposed facing each other on one side of a plurality of unit cells 10. That is, as shown in FIG. 2, the first connection part 51 and the second connection part 52 may be disposed facing each other parallel to the z-axis direction at one end of the long side of each unit cell 10.

The first connection part 51 and the second connection part 52 are connected to the first uncoated region 11a and the second uncoated region 12a of each unit cell 10, respectively. Therefore, the positions of the first uncoated region 11a and the second uncoated region 12a may be arranged corresponding to the positions of the first connection part 51 and the second connection part 52, respectively. For example, when the first connection part 51 and the second connection part 52 are disposed on the right side of the long side direction of the cell assembly 101 before being spiral-wound, the first uncoated region 11a of the first electrode 11 and the uncoated region 12a of the second electrode 12 may be positioned to the right of the long side direction of each unit cell 10. Also, when the first connection part 51 and the second connection part 52 are disposed on the left side of the long side direction of the cell assembly 101 before being spiral-wound, the first uncoated region 11a of the first electrode 11 and the second uncoated region 12a of the second electrode 12 in each unit cell 10 may be located on the left side of the long side direction of each unit cell 10.

At this time, the cell assembly 101 may be composed by spiral-winding a plurality of unit cells 10 in one direction with reference to the first connection part 51 and the second connection part 52. (Referring to FIG. 3) In the cell assembly 101, the first connection part 51 and the second connection part 52 may each be formed as one member. In other words, each of the first connection part 51 and the second connection part 52 is not constituted by connecting a plurality of connection parts extending from each unit cell 10 by welding. That is, the cell assembly 101 includes the first connection part 51 connecting each of the unit cells 10 and made of a single member and the second connection part 52 connecting each of the unit cells 10 and made of a single member.

Each of the first connection part 51 and the second connection part 52 may be formed in a strip shape having a predetermined width, as an example.

The first connection part 51 may include a first region 151 exposed between the plurality of unit cells 10 surrounded by the casing member 15 and disposed to be separated, and a second region 251 exposed at one end of the cell assembly 101 without being wrapped by the casing member 15.

The part of the first region 151 is connected to the first uncoated regions 11a included in each unit cell 10. Thus, the first connection part 51 may electrically connect the first electrodes 11 included in each unit cell 10.

As a result, the second region 251, which is exposed at one end of the cell assembly 101 without the first connection portion 51 being wrapped around the casing 15, may constitute a first electrode tab. Also, the first connection part 51 may be made of the same material as the first current collector.

The second connection part 52 may include a third region 152, which is surrounded by the casing member 15 and exposed between the plurality of unit cells 10, and a fourth region 252, which is not enclosed by the casing member 15 but is exposed at one end of the cell assembly 101.

The part of the second region 251 is connected to the second uncoated regions 12a included in each unit cell 10. Therefore, the second connection part 52 may electrically connect the second electrodes 12 included in each unit cell 10.

Resultantly, the fourth region 252 in which the second connection part 52 is exposed to the other end of the cell assembly 101 without being wrapped in the casing member 15 may constitute a second electrode tab. Also, the second connection part 52 can be made of the same material as the second current collector.

At this time, an insulating member 20 may be disposed between the neighboring unit cells 10. The insulating member 20 is disposed in the region where the first connection part 51 and the second connection part 52 face each other, that is, between the first region 151 and the third region 152, and is enclosed by the casing member 15. In addition, the insulating member 20 serves to electrically isolate the first connection part 51 and the second connection part 52.

The plurality of unit cells 10 may be disposed in parallel to be spaced apart by a predetermined interval along one direction and may be connected by the first connection part 51 and the second connection part 52, respectively, as described above. The number of the plurality of unit cells 10 included in the rechargeable battery 100 of the present disclosure may be appropriately adjusted according to the capacity of the rechargeable battery 100 to be implemented.

Thus, since the plurality of unit cells 10 are arranged in parallel along one direction at the predetermined interval, the rechargeable battery 100 of the present disclosure is highly flexible.

That is, since the rechargeable battery 100 of the present disclosure is easily foldable, bendable, or rollable under the above-described structural characteristic, there is an advantage that the rechargeable battery 100 of the present disclosure may be applied without being greatly affected by the type of flexible electronic device that it is to be applied to as the energy source.

Figure 3:
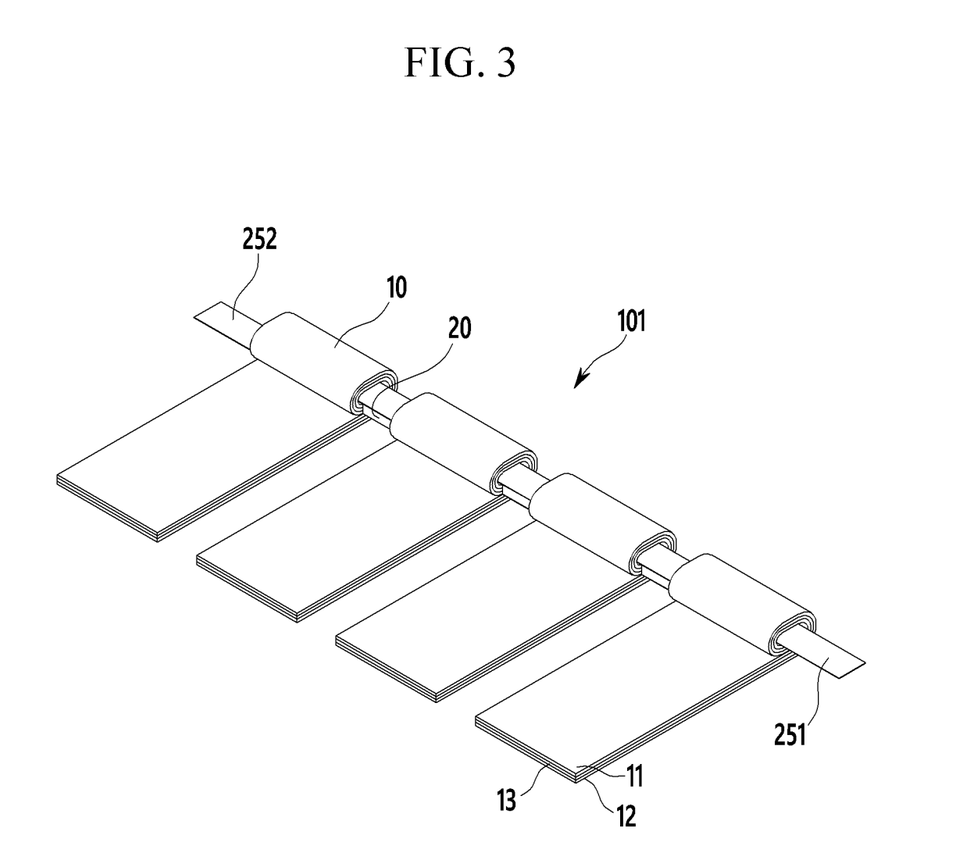
FIG. 3 is a view showing a shape that the rechargeable battery according to FIG. 2 is spiral-wound.

FIG. 3 shows an example of the shape in which the rechargeable battery according to FIG. 2 is spiral-wound.

Referring to FIG. 3, in the cell assembly 101 of the present disclosure, as described above, the plurality of unit cells 10 arranged at the predetermined interval in one direction are spirally wound in one direction with reference to the first connection part 51 and the second connection part 52.

Figure 4:
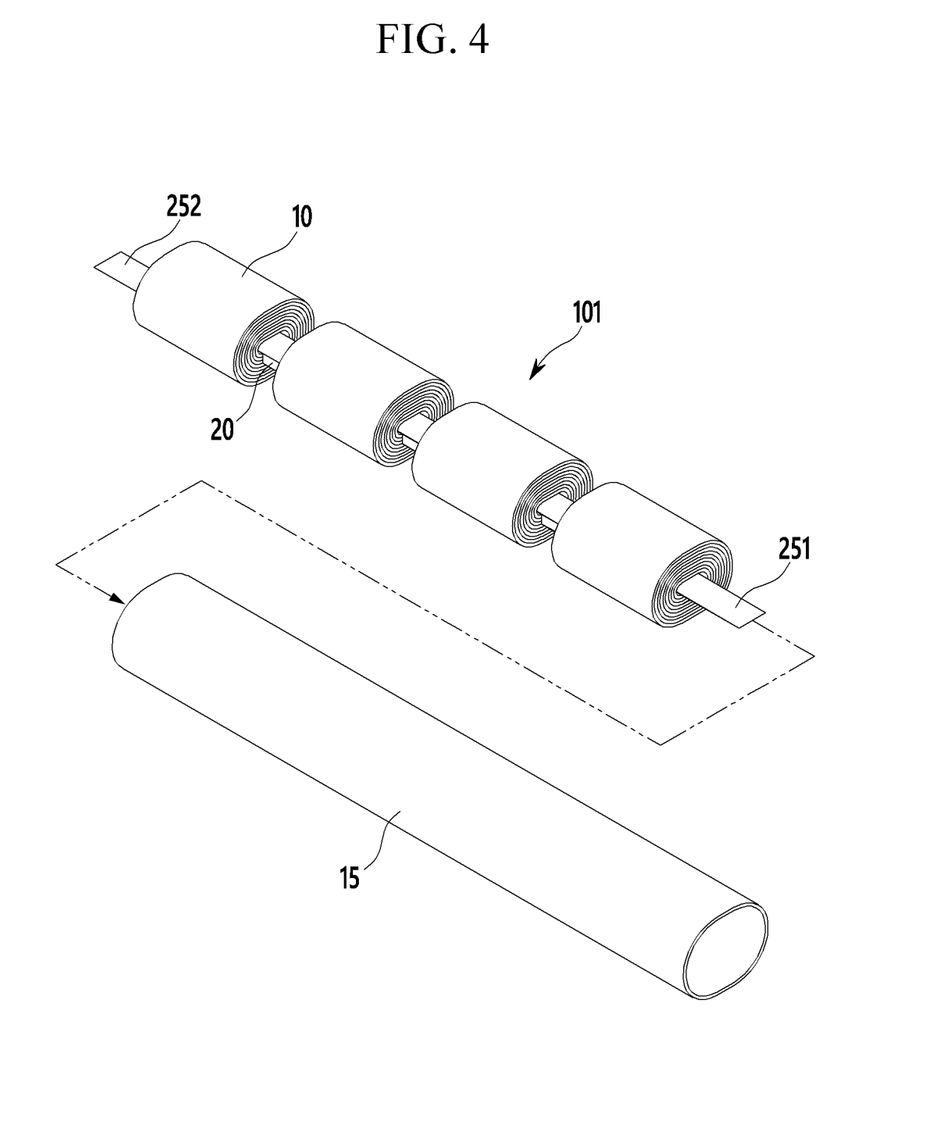
FIG. 4 is an exploded perspective view of the rechargeable battery according to FIG. 1.

FIG. 4 shows how the cell assembly according to FIG. 3 is housed in the casing member.

Referring to FIG. 4, the cell assembly 101 that is spiral-wound as shown in FIG. 3 is accommodated in the casing member 15 composed of one member. The casing member 15 has, for example, as shown in FIG. 4, a circular column shape, and although not shown, it may have a rectangular column shape or a triangular column shape. The shape of the casing member 15 is not particularly limited as long as it can accommodate the cell assembly 101 and expose the second region 251 and the fourth region 252 corresponding to the first electrode tab and the second electrode tab.

The casing member 15 is shrinkable, and may be made of, for example, a rubber material having heat shrinkability. That is, after the cell assembly 101 is built in the casing member 15, the rechargeable battery 100 of the shape as shown in FIG. 1 may be constituted through the shrinkage process.

Therefore, the casing member 15 of the present disclosure has a relatively low sealing area because only the surface exposed to the outside in the first connection part 51 and the second connection part 52 needs to be sealed, thereby being excellent in sealing property.

Figure 5:
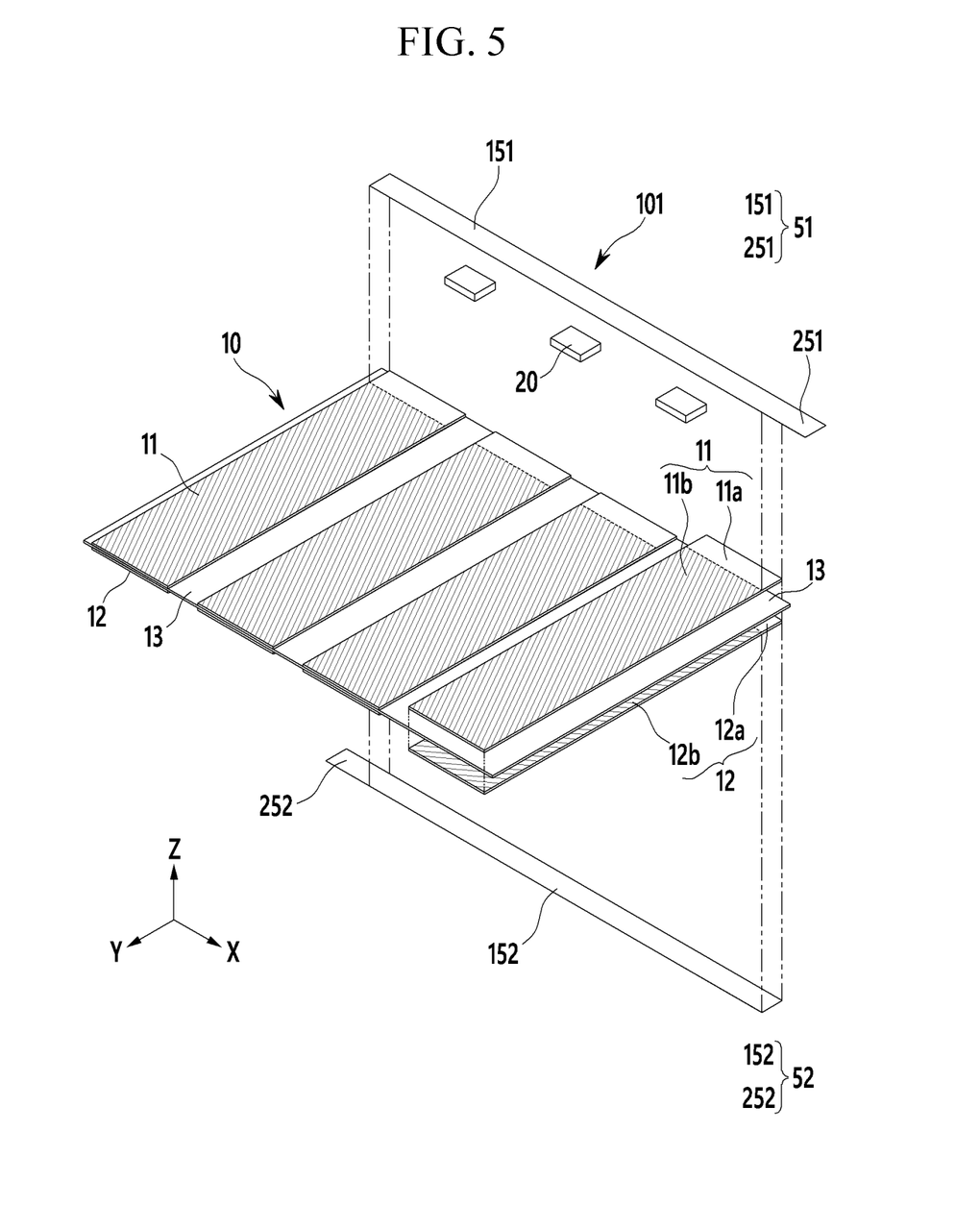
FIG. 5 to FIG. 7 are exploded perspective views showing a rechargeable battery according to another exemplary embodiment of the present disclosure before spiral-winding.

FIG. 5 is an exploded perspective view of the rechargeable battery according to another exemplary embodiment of the present disclosure before spiral-winding.

Referring to FIG. 5, in each unit cell 10 included in the rechargeable battery according to the present exemplary embodiment, the separator 13 interposed between the first electrode 11 and the second electrode 12 may be configured as one member in the entire cell assembly 101. That is, each unit cell 10 does not include a separate separator 13 as shown in FIG. 2, but as shown in FIG. 5, a separator 13 configured of one single member in the cell assembly 101 is included, and the separator 13 may be configured to separate the first electrode 11 and the second electrode 12 of each unit cell 10.

In the present exemplary embodiment, the cell assembly 101 may be configured in which the plurality of unit cells 10 arranged to be spaced apart in parallel by the predetermined interval are spiral-wound in one direction with respect to the first connection part 51 and the second connection part 52.

Thus, according to the present exemplary embodiment, the separator 13 is disposed between the adjacent unit cells 10 in the spiral-wound cell assembly 101 along with the insulating member 20.

As above-described, when the cell assembly 101 includes the separator 13 configured of the single member, since the separator 13 configured of the flexible material is also disposed between the neighboring unit cells 10, the flexibility of the rechargeable battery according to the present disclosure may be further improved.

The rechargeable battery according to the present exemplary embodiment is the same as the rechargeable battery 100 according to an exemplary embodiment with reference to FIG. 1 to FIG. 4 except for the shape of the separator 13, thus the detailed description of other configurations and features except for the shape of the separator 13 is omitted.

Figure 6:
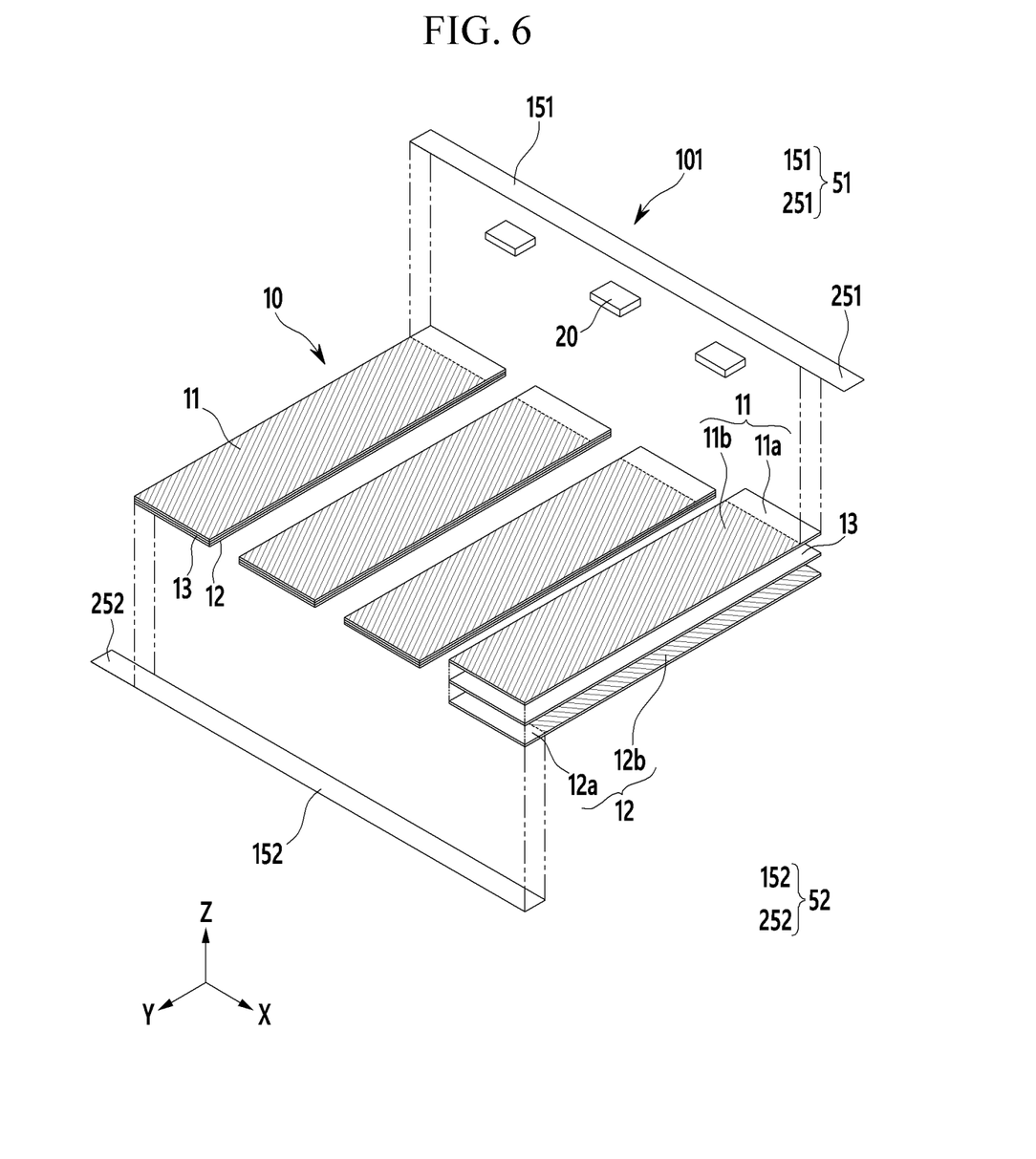

FIG. 6 is an exploded perspective view of the rechargeable battery according to another exemplary embodiment of the present disclosure before spiral-winding.

Referring to FIG. 6, in the present exemplary embodiment, the first connection part 51 may be disposed at one side of the plurality of unit cells 10, and the second connection part 52 may be disposed at the other side of the plurality of unit cells 10 parallel in a diagonal direction on the cross-section perpendicular to the first connection part 51.

That is, the first connection part 51 may be disposed at one end of the long side direction of each unit cell 10, and the second connection part 52 may be disposed at the other end of the long side direction of each unit cell 10, in parallel in the diagonal direction based on the first connection part 51 on the zy plane.

Accordingly, in the rechargeable battery according to the present exemplary embodiment, the first uncoated region 11a and the second uncoated region 12a of each unit cell 10 respectively connected to the first connection part 51 and the second connection part 52 may be disposed corresponding to the positions of the first connection part 51 and the second connection part 52. For example, when the first connection part 51 is disposed at the right in the long side direction of the cell assembly 101 and the second connection part 52 is disposed at the left side for the spiral-winding, in each unit cell 10, the first electrode 11 may be disposed so that the first uncoated region 11a is disposed at the right side in the long side direction of each unit cell 10 and the second electrode 12 may be disposed so that the second uncoated region 12a is disposed at the left side in the long side direction of each unit cell 10.

Also, when the first connection part 51 is disposed at the left side in the long side direction of the cell assembly 101 and the second connection part 52 is disposed at the right side for the spiral-winding, in each unit cell 10, the first electrode 11 may be disposed so that the first uncoated region 11a is disposed at the left side in the long side direction of each unit cell 10 and the second electrode 12 may be disposed so that the second uncoated region 12a is disposed at the right side in the long side direction of each unit cell 10.

In this case, the insulating member 20 disposed between the adjacent unit cells 10 to electrically insulate the first connection part 51 and the second connection part 52 may be disposed under the first connection part 51 or above the second connection part 52.

In the present exemplary embodiment, the cell assembly 101 may be configured to be spiral-wound in one direction based on the first connection part 51 or the second connection part 52.

The rechargeable battery according to the present exemplary embodiment is the same as the rechargeable battery 100 according to an exemplary embodiment with reference to FIG. 1 to FIG. 4 except for the arrangement relationship of the first connection part 51, the second connection part 52, the first uncoated region 11a, and the second uncoated region 12a. Therefore, detailed description of other configurations and features except the arrangement relationship of the first connection part 51, the second connection part 52, the first uncoated region 11a, and the second uncoated region 12a is omitted.

Figure 7:
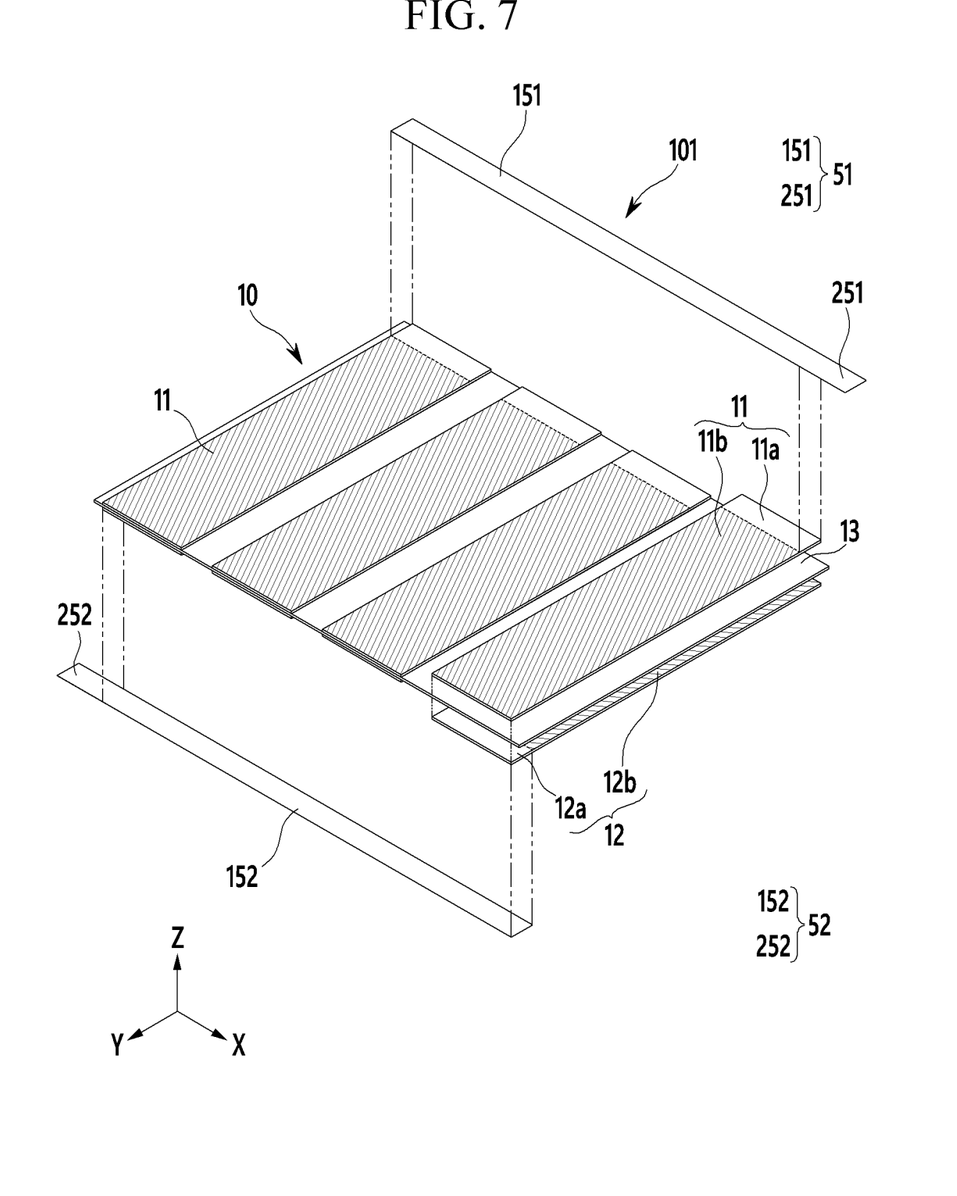

FIG. 7 is the exploded perspective view of the rechargeable battery according to another exemplary embodiment of the present disclosure before spiral-winding.

Referring to FIG. 7, in each unit cell 10 included in the rechargeable battery according to the present exemplary embodiment, the separator 13 interposed between the first electrode 11 and the second electrode 12 may be configured as one member in the entire cell assembly 101. That is, each unit cell 10 does not include a separate separator 13 as shown in FIG. 2, but as shown in FIG. 7, each unit cell 10 may include the separator 13 configured of the single member in the cell assembly 101, and the separator 13 may be configured to separate the first electrode 11 and the second electrode 12 in each unit cell 10.

Accordingly, in the cell assembly 101 that is spiral-wound according to the present exemplary embodiment, the separator 13 is disposed along with the insulating member 20 between the adjacent unit cells 10.

As above-described, in the cell assembly 101, when the separator 13 configured of the single member is included, since the separator 13 configured of the flexible material is disposed between the adjacent unit cells 10, the flexibility of the rechargeable battery of the present disclosure may be further improved.

On the other hand, the first connection part 51 may be disposed at one side of the plurality of unit cells 10, and the second connection part 52 may be disposed at the other side of the plurality of unit cells 10 parallel in a diagonal direction on the cross-section perpendicular to the first connection part 51.

That is, the first connection part 51 may be disposed at one end of the long side direction of each unit cell 10, and the second connection part 52 may be disposed the other end of the long side direction of each unit cell 10, in parallel in the diagonal direction based on the first connection part 51 on the zy plane.

Accordingly, in the rechargeable battery according to the present exemplary embodiment, the first uncoated region 11a and the second uncoated region 12a of each unit cell 10 respectively connected to the first connection part 51 and the second connection part 52 may be disposed corresponding to the positions of the first connection part 51 and the second connection part 52. For example, when the first connection part 51 is disposed at the right in the long side direction of the cell assembly 101 and the second connection part 52 is disposed at the left side for the spiral-winding, in each unit cell 10, the first electrode 11 may be disposed so that the first uncoated region 11a is disposed at the right side in the long side direction of each unit cell 10 and the second electrode 12 may be disposed so that the second uncoated region 12a is disposed at the left side in the long side direction of each unit cell 10.

Also, when the first connection part 51 is disposed at the left side in the long side direction of the cell assembly 101 and the second connection part 52 is disposed at the right side for the spiral-winding, in each unit cell 10, the first electrode 11 may be disposed so that the first uncoated region 11a is disposed at the left side in the long side direction of each unit cell 10 and the second electrode 12 may be disposed so that the second uncoated region 12a is disposed at the right side in the long side direction of each unit cell 10.

In this case, the insulating member 20 disposed between the adjacent unit cells 10 to electrically insulate the first connection part 51 and the second connection part 52 may be disposed under the first connection part 51 or above the second connection part 52.

In the present exemplary embodiment, the cell assembly 101 may be configured to be spiral-wound in one direction based on the first connection part 51 or the second connection part 52.

The rechargeable battery according to the present exemplary embodiment is the rechargeable battery 100 according to the exemplary embodiment with reference to FIG. 1 to FIG. 4 except for the shape of the separator 13 and the arrangement relationship of the first connection part 51, the second connection part 52, first uncoated region 11a, and the second uncoated region 12a. Accordingly, detailed description of other configurations and features except for the shape of the separator 13 and the arrangement relationship of the first connection part 51, the second connection part 52, the first uncoated region 11a, and the second uncoated region 12a is omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: unit cell
101: cell assembly

100: rechargeable battery
51: first connection part
52: second connection part
11: first electrode
12: second electrode
13: separator

The invention claimed is:

1. A rechargeable battery comprising:
a cell assembly including a plurality of unit cells spaced apart from one another along a lengthwise direction;
a casing member receiving the cell assembly;
a first connection part connecting the plurality of unit cells; and
a second connection part disposed parallel to the first connection part and connecting the plurality of unit cells,
wherein each of the plurality of unit cells includes a first electrode, a second electrode, and a separator interposed between the first electrode and the second electrode and spiral-wound with the first electrode and the second electrode, and the unit cells are spiral-wound about a same shared axis extending in the lengthwise direction, and
the separator included in each of the plurality of unit cells is configured as a single separator included in all of the plurality of unit cells.

2. The rechargeable battery of claim 1, wherein the first connection part electrically connects the first electrode included in each of the plurality of unit cells to configure a first electrode tab.

3. The rechargeable battery of claim 2, wherein the second connection part electrically connects the second electrode in each of the plurality of unit cells to configure a second electrode tab.

4. The rechargeable battery of claim 1, wherein the first connection part is configured as a single connection part.

5. The rechargeable battery of claim 1, wherein the second connection part is configured as a single connection part.

6. The rechargeable battery of claim 1, wherein the casing member is configured as a single casing.

7. The rechargeable battery of claim 1, wherein the first electrode includes a first coated region and a first uncoated region, and the first connection part is connected to the first uncoated region.

8. The rechargeable battery of claim 1, wherein the second electrode includes a second coated region and a second uncoated region, and the second connection part is connected to the second uncoated region.

9. The rechargeable battery of claim 1, wherein the first connection part includes:
a first region enclosed by the casing member and exposed between the plurality of unit cells; and
a second region exposed in one end of the cell assembly without being enclosed by the casing member.

10. The rechargeable battery of claim 9, wherein the second connection part includes:
a third region enclosed by the casing member and exposed between the plurality of unit cells; and
a fourth region exposed in one end of the cell assembly without being enclosed by the casing member.

11. The rechargeable battery of claim 10, wherein the cell assembly includes an insulating member disposed at a partial region where the plurality of unit cells are respectively adjacent to each other and where the first region and the third region face each other.

12. The rechargeable battery of claim 1, wherein the first connection part and the second connection part are disposed to face to each other and are spiral-wound at one side of the plurality of unit cells.

13. The rechargeable battery of claim 12, wherein, in the cell assembly, the plurality of unit cells are spiral-wound in one direction with respect to the first connection part and the second connection part.

14. The rechargeable battery of claim 1, wherein the first connection part is disposed at one side of the plurality of unit cells, and the second connection part is disposed at the other side of the plurality of unit cells parallel in a diagonal direction on a cross-section perpendicular to the first connection part to be spiral-wound.

15. The rechargeable battery of claim 14, wherein in the cell assembly, the plurality of unit cells are spiral-wound in one direction based on one of the first connection part and the second connection part.

* * * * *